(12) United States Patent
Boström

(10) Patent No.: US 8,146,419 B2
(45) Date of Patent: Apr. 3, 2012

(54) LIQUID LEVEL MEASUREMENT DEVICE

(75) Inventor: Jan Boström, Göteborg (SE)

(73) Assignee: Axsensor AB, Gothenburg (SE)

( * ) Notice: Subject to any disclaimer, the term of this patent is extended or adjusted under 35 U.S.C. 154(b) by 401 days.

(21) Appl. No.: 12/309,178

(22) PCT Filed: Jul. 9, 2007

(86) PCT No.: PCT/SE2007/000671
§ 371 (c)(1),
(2), (4) Date: Feb. 27, 2009

(87) PCT Pub. No.: WO2008/008018
PCT Pub. Date: Jan. 17, 2008

(65) Prior Publication Data
US 2009/0293607 A1    Dec. 3, 2009

(30) Foreign Application Priority Data
Jul. 12, 2006 (SE) ....................... 0601547

(51) Int. Cl.
*G01F 23/00* (2006.01)
*G01F 23/28* (2006.01)
(52) U.S. Cl. ...................... 73/290 V; 73/632
(58) Field of Classification Search ............... 73/290 V
See application file for complete search history.

(56) References Cited

U.S. PATENT DOCUMENTS 5,941,279 A * 8/1999 Frank et al. ............... 137/574
6,047,602 A * 4/2000 Lynnworth ................ 73/632

FOREIGN PATENT DOCUMENTS

| DE | 42 01 037 | 7/1993 |
| DE | 199 55 133 | 5/2001 |
| EP | 0 435 488 | 7/1991 |
| EP | 0 864 458 | 9/1998 |
| GB | 2 164 151 | 3/1986 |
| WO | WO 96/10734 | 4/1996 |
| WO | WO 2005/038415 | 4/2005 |

* cited by examiner

*Primary Examiner* — Hezron E Williams
*Assistant Examiner* — Gregory J Redmann
(74) *Attorney, Agent, or Firm* — Harness, Dickey & Pierce, P.L.C.

(57) ABSTRACT

The present invention relates to a device (10) for providing a temperature compensated measurement of the level of a liquid (14) in a tank (12; 30). The device comprises a transducer (22) for transmitting and receiving acoustic signals, and a waveguide (24) connected to the transducer and adapted to extend into the liquid. The device is characterized by means (16; 18; 40) for directing a flow of liquid originating from the tank of along the exterior of a portion of the waveguide which during operation is located above the liquid level. The present invention also relates to a corresponding method for providing a temperature compensated measurement of the level of a liquid in a tank.

15 Claims, 3 Drawing Sheets

LIQUID LEVEL MEASUREMENT DEVICE

TECHNICAL FIELD

The present invention relates to a liquid level measurement device. In particular, the present invention relates to a device for providing a temperature compensated measurement of the level of a liquid in a tank. The present invention also relates to a method for providing a temperature compensated measurement of the level of a liquid in a tank.

TECHNICAL BACKGROUND

An example of a liquid level measurement device is disclosed in the document WO2005038415. The device comprises a transducer arranged outside the liquid for transmitting and receiving acoustic signals, and a waveguide connected to the transducer and extending into the liquid. In the basic operation of the device, an acoustic signal is transmitted from the transducer into the waveguide, which signal is reflected by the surface of the liquid into which the waveguide extends. By knowing the transit time and the velocity of the signal, it is possible to calculate the liquid level.

It in a known fact that the velocity of acoustic signals is dependent on for example temperature, which may render the measurement erroneous. To this end, the device in WO2005038415 comprises a reference system, wherein the acoustic signal travels a known distance in order to determine the current speed of sound, whereby the current speed of sound is used to calculate the liquid level.

However, for example when the liquid level is low, there may be a significant temperature difference throughout the measurement device, making the measurement erroneous. This even though a reference system is used, since the temperature in the reference system may differ from that of other parts of the measurement device.

SUMMARY OF THE INVENTION

It is an object of the present invention to overcome this problem, and to provide a liquid level measurement device with improved temperature compensation.

This and other objects that will be evident from the following description is achieved by a device for providing a temperature compensated measurement of the level of a liquid in a tank, and a corresponding method, according to the appended claims.

According to an aspect of the invention, there is provided a device comprising a transducer for transmitting and receiving acoustic signals, and a waveguide connected to the transducer and adapted to extend into the liquid, characterized by means for directing a flow of liquid originating from the tank along the exterior of a portion of the waveguide which during operation is located above the liquid level.

By having means for directing the flow of liquid originating from the tank along the exterior of a portion of the waveguide which is located above the liquid level, the temperature becomes essentially the same throughout the whole of the waveguide, whereby the level measurement using the speed of sound in the waveguide, which speed is temperature dependant, becomes very accurate.

It should be noted that WO2005038415 discloses a device comprising means for feeding a flow of fluid originating from the tank into the portion of the waveguide which is located above the liquid level. The purpose of this is to provide a gas composition compensated measurement. However, in some instances, only the temperature is of interest, whereby it is much more convenient from a construction and cost point of view to provide the liquid along the exterior of the waveguide than inside the waveguide. The latter requires for instance an aperture for feeding fluid into the waveguide as well as drainage facilities.

In one embodiment, the directing means is a suction and/or return pipe of a fuel pump associated with the tank. Preferably, the waveguide and the suction and/or return pipe are arranged adjacent to each other. For example, part of the waveguide can be arranged along side the suction and/or return pipe so that the temperature of the latter can be transferred to the former. In another example, part of the waveguide is accommodated in a housing and the suction and/or return pipe runs adjacent to or through the housing, again for transferring the temperature from the suction and/or return pipe to the waveguide. Further, the waveguide and the suction and/or return pipe can be integrated to a single structure, which facilitates manufacturing and assembly and lowers cost. Here, the fuel pump advantageously provides the flow of liquid from the tank. An advantage with using the suction and/or return pipe of the fuel pump is that no additional dedicated means for directing the liquid flow is necessary, which lowers cost.

In another embodiment, the tank is a saddle tank having a first and second section and an ejector system with a transportation pipe for transferring liquid between the sections, and the directing means is the transportation pipe of the ejector system. The device may additionally comprising a second waveguide, which can be connected to the same transducer as the first waveguide or to its own transducer. Preferably, the first waveguide extends into the first section of the saddle tank, while the second waveguide extends into the second section of the saddle tank. Further, the ejector system's transportation pipe should also direct the flow of liquid along the exterior of a portion of the second waveguide which is located above the liquid level. This setup allows compensated measurements in both sections of the saddle tank, which provides for a more accurate overall measurement.

As above, the waveguide(s) and the transportation pipe are preferably arranged adjacent to each other. For example, part of the waveguide(s) can be arranged along side the transportation pipe so that the temperature of the latter can be transferred to the former. In another example, part of the waveguide(s) is accommodated in a housing and the transportation pipe runs adjacent to or through the housing, again for transferring the temperature from the transportation pipe to the waveguide. Further, the waveguide(s) and the transportation pipe can be integrated in a single structure, which facilitates manufacturing and assembly and lowers cost. Here, the ejector system advantageously provides the flow of liquid from the tank. An advantage with using the transportation pipe of the ejector system is that no additional dedicated means for directing the liquid flow is necessary.

The above measurement device is particularly useful in case the liquid to be measured is diesel, since temperature is the predominant factor to consider for diesel. Gas composition compensation is not that relevant because diesel does not evaporate to such a large extent as for example gasoline or petrol.

According to another aspect of the invention, there is provided a method for providing a temperature compensated measurement of the level of a liquid in a tank, comprising transmitting an acoustic signal from a transducer into a waveguide adapted to extend into the liquid, and receiving a reflected acoustic signal to the transducer from the waveguide, characterized by directing a flow of liquid originating from the tank along the exterior of a portion of the waveguide which during operation is located above the liquid level. This aspect exhibits similar advantages as the previously discussed aspect of the invention.

According to yet another aspect of the invention, there is provided a tank arrangement, comprising: a tank, and a device according to the above discussion. This aspect exhibits similar advantages as the previously discussed aspects of the invention.

BRIEF DESCRIPTION OF THE DRAWINGS

These and other aspects of the present invention will now be described in more detail, with reference to the appended drawings showing currently preferred embodiments of the invention.

DETAILED DESCRIPTION OF CURRENTLY PREFERRED EMBODIMENTS

Figure 1B:
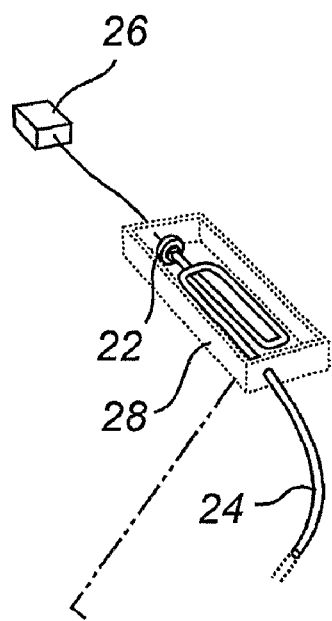
FIG. 1b is an enlarged schematic partial perspective view of the measurement device of FIG. 1a, FIG. 2a is a schematic perspective view of a measurement device according to another embodiment of the present invention, which measurement device is arranged in a saddle tank.
Figure 1A:
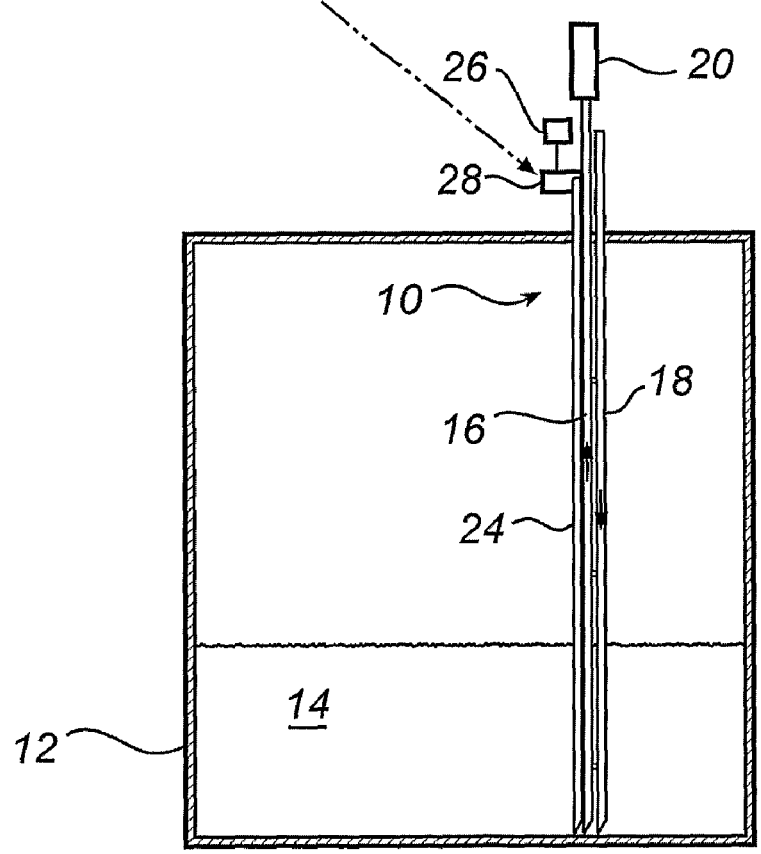
FIG. 1a is a schematic side view of a fuel tank with a measurement device according to an embodiment of the present invention.

FIG. 1a is a schematic side view of a tank 12 with a measurement device 10 according to an embodiment of the present invention. The tank 12 can be a fuel tank for a vehicle, such as a car, a truck or a boat, and the measurement device 10 is adapted to detect the level of fuel 14 in the tank 12.

In the tank 12, except for the measurement device 10, there is provided a suction pipe 16 and a return pipe 18. The suction pipe 16 is connected to a fuel pump 20 placed outside the tank 12, while the return pipe 18 is connected to a fuel return system (not shown) also placed outside the tank 12. The suction pipe 16 and the return pipe 18 may be integrated to a single structure.

Upon operation, fuel 14 from the tank 12 is sucked up by the fuel pump 20 via the suction pipe 16, while excessive or "unused" fuel is returned to the tank 12 via the return pipe 18, according to known techniques. Thus, during operation, a flow of fuel is provided in both the suction pipe 16 and the return pipe 18 by the fuel pump 20 and the fuel return system, respectively.

The structure and operation of the measurement device 10 will now be described with reference to FIGS. 1a and 1b. The measurement device 10 comprises a transducer 22 and a waveguide 24 connected to the transducer 22. In FIG. 1a, the transducer 22 is placed outside the tank 12, but it could alternatively be placed inside at the top of the tank 12. The transducer 22 is further arranged in connection with an electronic control device 26, which also is placed outside the tank 12. Further, the transducer 22 may be a combined unit, or comprise a separate transmitter and receiver, e.g.

The waveguide 24 extends from the transducer 22 down to the bottom of the tank 12, into the fuel 14. More precisely, according to the present embodiment of the invention, the waveguide 24 is arranged along side the suction pipe 16 and/or the return pipe 18. The waveguide 24 and at least one of the suction pipe 16 and the return pipe 18 may be placed in contact with each other (as in FIG. 1a) and they may even be integrated to a single structure. Also, the waveguide 24 and at least one of the suction pipe 16 and the return pipe 18 may be enclosed by a common elongated housing pipe (not shown). Further, the portion of the waveguide 24 close to the transducer 22 having a flat spiral shape, or any housing 28 accommodating said portion, should be positioned close to or in contact with the suction pipe 16 and/or the return pipe 18. Alternatively, the suction pipe 16 and/or the return pipe 18 could run through the housing 28 (not shown).

Upon operation of the measurement device 10, the electronic control device 26 energizes the transducer 22 to generate acoustic pulses. A pulse transmitted from the transducer 22 is guided through the waveguide 24 towards the surface of the fuel 14 in the tank 12, which pulse travels through the waveguide 24, is then reflected by the surface, and finally returns to the transducer 22. In response to the returning pulse, the transducer 22 generate corresponding a signal to the control device 26. By knowing the transit time and velocity of the pulse, the control device 26 can calculate the fuel level or fuel volume in the tank 12. To increase the accuracy of the measurements, the measurement device 10 can further comprise a reference system (not shown). For instance, a reference element could be provided in the waveguide, preferably just after the spiral portion and above the highest possible fuel level, creating a reference portion of the waveguide between the transducer and the reference element. An example of such a reference system and more is described in the above mentioned document WO2005038415, the content of which hereby is incorporated by reference.

Further, since they are arranged adjacent to each other, the flow of fuel in the suction pipe 16 and the return pipe 18 is directed along the exterior of the waveguide 24. This, and the fact that the housing 28 also is arranged adjacent to the suction pipe 16 and the return pipe 18, allows "the temperature" of the fuel in the suction pipe 16 and the return pipe 18 to be transferred to a portion of the waveguide 24 which is located above the fuel level, which levels the conditions throughout the waveguide 24 with respect to temperature, which in turn allows more accurate measurements since the velocity of the acoustic pulses (which depends on temperature) becomes essentially the same throughout the waveguide 24 located above the main fuel level. The flow of fuel originating from the tank may come directly from the tank 12 (in the case with the suction pipe 16), or indirectly via a fuel return system (in the case with the return pipe 18), for example.

The measurement device according to the present invention is particularly useful in case the fuel to be measured is diesel, since temperature is the predominant factor to consider for diesel. Gas composition, which also may affect the pulse velocity, is not that relevant because diesel does not evaporate to such a large extent as for example gasoline or petrol.

Figure 2A:
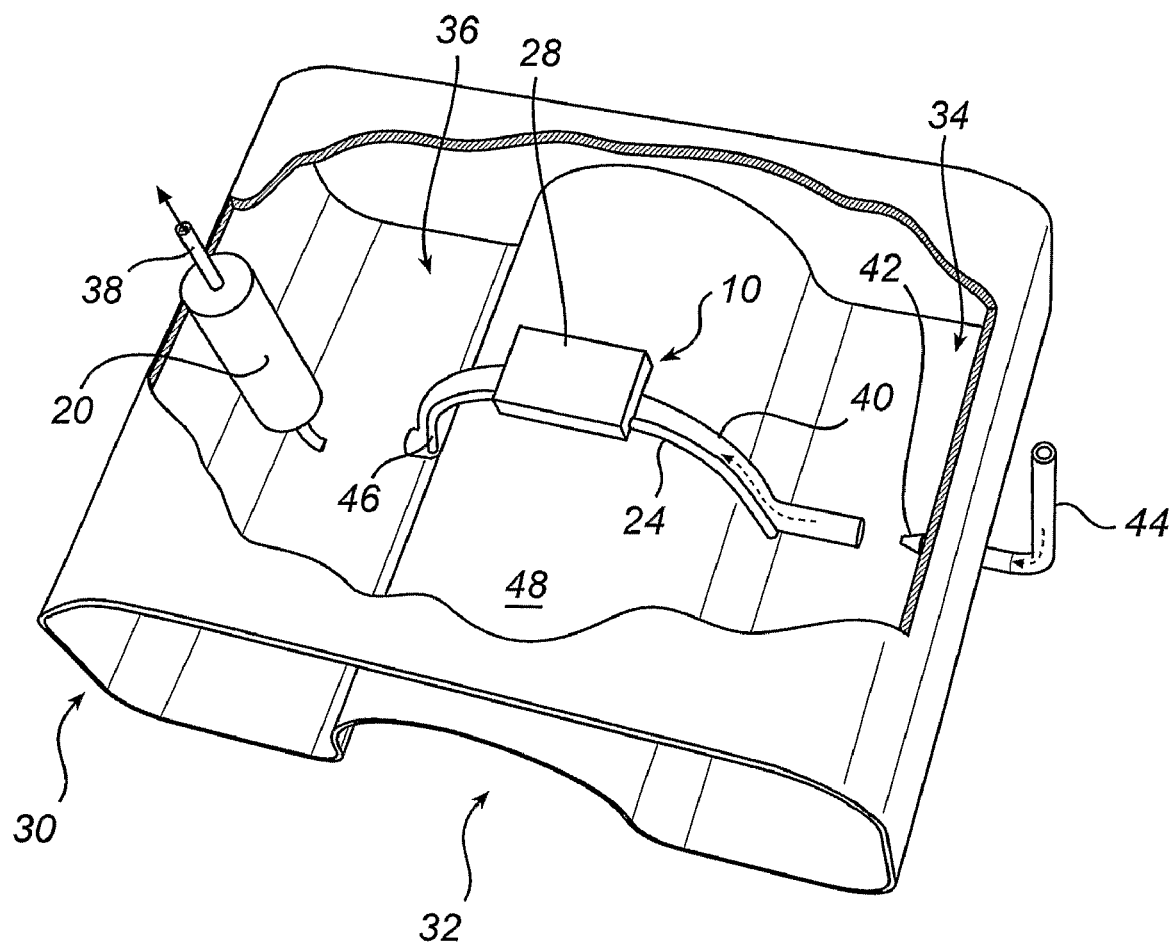
FIG. 2b is a schematic side view of the saddle tank and measurement device of FIG. 2a, and FIG. 2c is a variant of the saddle tank and measurement device of FIGS. 2a-2b.
Figure 2B:
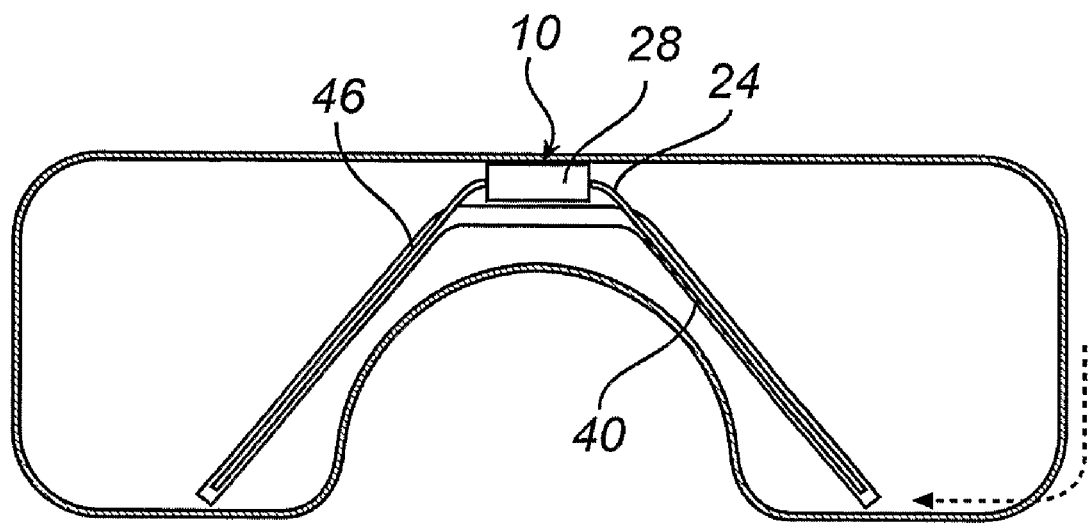
Figure 2C:
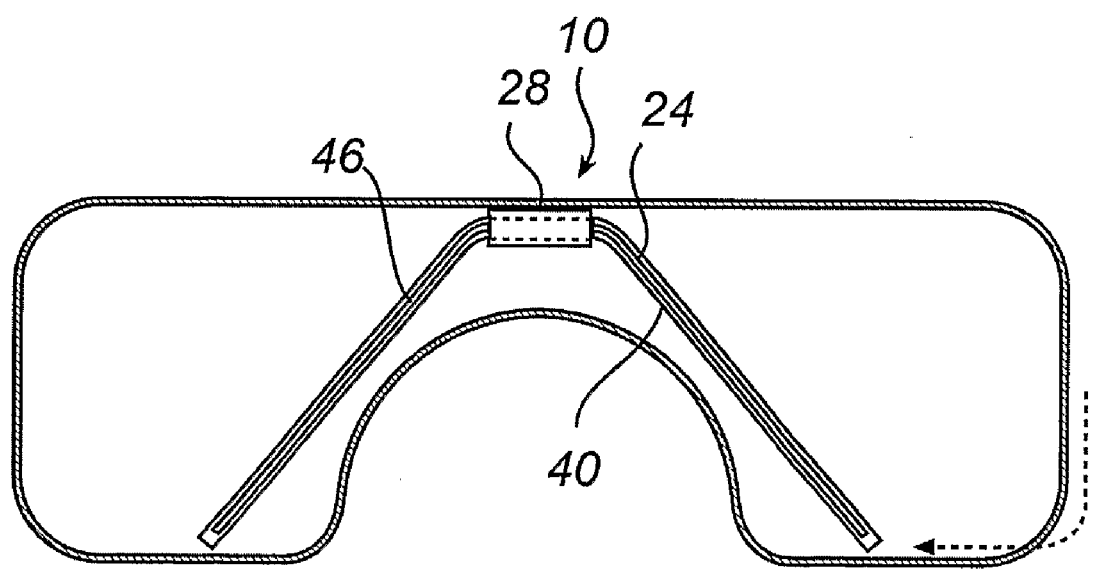

FIGS. 2a-2c illustrate a measurement device 10 according to another embodiment of the present invention, which measurement device here is arranged in a saddle tank 30.

The saddle tank has an indentation 32 at its bottom forming a first section 34 and a second section 36. The indentation is usually for passage of the vehicle's drive shaft (not shown). The fuel pump 20 is arranged in the second section 36, and it is adapted to pump fuel out of the tank via a feed pipe 38. Alternatively, the fuel pump could be placed outside the tank. Additionally, an ejector system is provided for transferring any fuel left in the first section 34 to the fuel pump 20.

The exemplary ejector system in FIG. 2 comprises a first transportation pipe 40 extending from the first section 34 to the second section 36, and a second transportation pipe 44. In FIG. 2, the second transportation pipe 44 is a fuel return pipe which returns excessive fuel from a fuel return system (not shown) placed outside the tank 30, and it ends with a nozzle 42 aimed towards the entrance of the first transportation pipe 40 in the first section 34.

The ejector system operates in accordance with the known principle of suction jet. Upon operation of the ejector system, fuel is fed from the fuel return system via the second transportation pipe 44 to the nozzle 42. At the nozzle 42, a suction pressure is produced in a known manner, causing fuel in the first section 34 to be transferred via the first transportation pipe 40 to the second section 36, where it can be pumped out of the tank 30 by the fuel pump 20. Thus, during operation, a flow of fuel is provided by the ejector system in the transportation pipe 40.

The measurement device 10 in FIGS. 2a-2c is similar to that of FIGS. 1a and 1b, but includes additionally a second waveguide 46. The second waveguide 46 can be connected to the transducer 22 (shown in FIG. 1b) or to its own transducer (not shown) and extends into one section 36 of the saddle tank 30, while the first waveguide 24 extends into the other section 34 of the saddle tank 30. More precisely, the waveguides 24, 46 are arranged along side the first transportation pipe 40. The waveguides 24, 46 and the transportation pipe 40 may even be integrated to a single structure, so that the waveguides 24, 46 are in contact with the transportation pipe 40. Also, the waveguides 24, 46 and the transportation pipe 40 could be enclosed by a common elongated housing (not shown). Further, the spiral portions of the waveguides 24, 46, or any housing 28 accommodating said portions, should be positioned close to or in contact with the transportation pipe 40, at the top of the tank 30 in a narrow passage 48 above the indentation 32 between the sections 34, 36, as illustrated in FIG. 2b. Alternatively, the transportation pipe 40 could run through the housing 28, as illustrated in FIG. 2c. The housing 28 may also be integrated with the waveguides 24, 46 and the transportation pipe 40 to form a single structure.

Upon operation, the measurement device 10 in FIG. 2 functions similar to that of FIGS. 1a and 1b, but due to the two waveguides 24, 46 it provides two measurements, one for each section 34, 36 of the saddle tank 30, whereby the overall measure of the level of fuel 14 in the tank 30 advantagsously is the average of the two measurements. Further, since they are arranged adjacent to each other, the flow of fuel in the transportation pipe 40 is directed along the exterior of the waveguides 24, 46. This allows "the temperature" of the fuel in the transportation pipe 40 to be transferred to portions of the waveguides 24, 46 which are located above the fuel level, which levels the conditions throughout the waveguides 24, 46 with respect to temperature, which in turn allows more accurate measurements since the velocity of the pulses (which depends on temperature) becomes essentially the same throughout the waveguides 24, 46 located above the main fuel level.

The measurement device according to the invention using two waveguides is also advantageous in that only a single opening to the saddle tank is necessary. With the setup of FIGS. 2a-2c, only the waveguide 24 extends into the first section 34 via the narrow passage 48. The likelihood that the waveguide will malfunction is very small, and even if it should, it is a relatively easy operation to insert a new waveguide into the first section via the narrow passage from the opening at the fuel pump side of the tank. This should be compared to a case where a traditional float measurement device is arranged in the first section. To be able to repair the float in case of malfunction, an additional opening in the tank at the first section for accessing said section to reach the float is required.

Also, in the manufacturing, a so called "ship-in-a-bottle" (SIB) technique may advantageously be used, wherein the tank is formed around the measurement device (and any other tank components, such as the fuel pump, parts of the ejector system, etc.). A plastic fuel tank may for example be blow moulded to encompass the measurement device and any other tank components.

The person skilled in the art realizes that the present invention by no means is limited to the preferred embodiments described above. On the contrary, many modifications and variations are possible within the scope of the appended claims. For example, the above ejector system can be designed in various ways within the scope of the present invention. For example, instead of being a fuel return pipe which returns excessive fuel, the second transportation pipe can be branched directly from the feed pipe and run inside the tank to the nozzle. Such a second transportation pipe could also be used as the directing means. For example, it could be arranged so as to pass through the housing accommodating the spiral portions of the waveguides. Also, instead of being arranged in the first section, the nozzle can be arranged at the first transportation pipe in the second section of the saddle tank. Suitable ejector systems which can be used in conjunction with the present invention are disclosed in the documents U.S. Pat. No. 5,941,279, DE19955133, DE4201037, and EP0864458, for example.

Further, although acoustic pulses have been used in the described embodiments, the inventive measurement device may also be used with other measurement modes such as standing wave measurement.

Further, instead of the suction/return or transportations pipe, a dedicated pipe could be used. Also, a dedicated device such as a pump could be used to provide the flow of liquid from the tank.

The invention claimed is:

1. A device for providing a temperature compensated measurement of the level of a liquid in a tank, comprising:
   a transducer for transmitting and receiving acoustic signals,
   a waveguide connected to the transducer and adapted to extend into the liquid, and
   structure for directing a flow of liquid originating from the tank along the exterior of a portion of the waveguide which during operation is located above the liquid level.

2. A device according to claim 1, wherein the structure for directing a flow of liquid is a pipe.

3. A device according to claim 2, wherein the waveguide and the pipe are arranged adjacent to each other.

4. A device according to claim 3, wherein the pipe is located directly adjacent to an entire length of the waveguide.

5. A device according to claim 2, wherein at least part of the waveguide and the pipe are arranged along side each other.

6. A device according to claim 2, wherein part of the waveguide is accommodated in a housing, and wherein the pipe runs adjacent to or through the housing.

7. A device according to claim 2, wherein the waveguide and the pipe are integrated to a single structure.

8. A device according to claim 2, wherein said pipe is a suction and/or return pipe of a fuel pump associated with the tank.

9. A device according to claim 2, wherein the tank is a saddle tank having a first and second section and an ejector system with a transportation pipe for transferring liquid between the sections, and said pipe is the transportation pipe of the ejector system.

10. A device according to claim 9, further comprising a second waveguide connected to the transducer and adapted to extend into the liquid.

11. A device according to claim 1, wherein the liquid is diesel fuel.

12. A tank arrangement, comprising:
   the tank, and
   a device according to claim 1.

13. A device according to claim 1, wherein the waveguide extends to a bottom of the tank.

14. A device according to claim 2, wherein part of the waveguide is accommodated in a housing, and wherein the pipe runs through the housing.

15. A method for providing a temperature compensated measurement of the level of a liquid in a tank, comprising:
   transmitting an acoustic signal from a transducer into a waveguide adapted to extend into the liquid,
   receiving a reflected acoustic signal to the transducer from the waveguide, and
   directing a flow of liquid originating from the tank along the exterior of a portion of the waveguide which during operation is located above the liquid level.

* * * * *

UNITED STATES PATENT AND TRADEMARK OFFICE
CERTIFICATE OF CORRECTION

PATENT NO. : 8,146,419 B2
APPLICATION NO. : 12/309178
DATED : April 3, 2012
INVENTOR(S) : Jan Boström Page 1 of 1

It is certified that error appears in the above-identified patent and that said Letters Patent is hereby corrected as shown below:

On the Title Page, Item (30) should read

(30)  Foreign Application Priority Data

Jul. 12, 2006   (SE) .................................0601547-3

Signed and Sealed this
Seventh Day of August, 2012

David J. Kappos
*Director of the United States Patent and Trademark Office*